US012280589B2

United States Patent
(12) United States Patent
Takeuchi et al.

(10) Patent No.: US 12,280,589 B2
(45) Date of Patent: Apr. 22, 2025

(54) INK JET RECORDING APPARATUS AND INK JET RECORDING METHOD

(71) Applicant: CANON KABUSHIKI KAISHA, Tokyo (JP)

(72) Inventors: Keiichirou Takeuchi, Tokyo (JP); Koji Inoue, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 198 days.

(21) Appl. No.: 17/839,720

(22) Filed: Jun. 14, 2022

(65) Prior Publication Data

US 2022/0396083 A1 Dec. 15, 2022

(30) Foreign Application Priority Data

Jun. 15, 2021 (JP) ................................ 2021-099785
Jun. 9, 2022 (JP) ................................ 2022-093791

(51) Int. Cl.
*B41J 11/00* (2006.01)
*B41J 2/12* (2006.01)

(52) U.S. Cl.
CPC ............... *B41J 11/007* (2013.01); *B41J 2/12* (2013.01)

(58) Field of Classification Search
CPC .... B41J 11/0015; B41J 2/04508; B41J 29/38; B41J 29/393; B41J 11/007; B41J 2/12; B41J 2203/01; B41J 2/035; B41M 5/0011; B41M 5/0017; B41M 5/0047; C09D 11/037; C09D 11/54; C09D 11/30; C09D 11/322; C09D 11/40
See application file for complete search history.

(56) References Cited

U.S. PATENT DOCUMENTS

| | | | | |
|---|---|---|---|---|
| 9,566,781 | B2 | 2/2017 | Takeuchi et al. | |
| 9,789,705 | B2 | 10/2017 | Takeuchi et al. | |
| 2014/0078212 | A1* | 3/2014 | Nakai | B41J 11/0015 347/16 |
| 2014/0204156 | A1* | 7/2014 | Gotou | C09D 11/40 347/100 |
| 2019/0126657 | A1* | 5/2019 | Kuroda | C09D 11/30 |

FOREIGN PATENT DOCUMENTS

| | | |
|---|---|---|
| JP | 2018-138384 A | 9/2018 |
| JP | 2019-130869 A | 8/2019 |

* cited by examiner

*Primary Examiner* — Jannelle M Lebron
(74) *Attorney, Agent, or Firm* — Venable LLP

(57) ABSTRACT

An ink jet recording apparatus according to the present invention includes: a conveying unit that conveys a recording medium; a pretreatment unit that performs corona treatment on a surface of the recording medium; an ink image forming unit configured to be able to form an ink image by applying an ink of at least two colors, the ink containing an anionic pigment; a brightness measuring unit that measures brightness of the ink image; and a corona treatment intensity changing unit configured to change a corona treatment intensity of the pretreatment unit based on a result of the brightness measuring unit.

9 Claims, 9 Drawing Sheets

INK JET RECORDING APPARATUS AND INK JET RECORDING METHOD

BACKGROUND OF THE INVENTION

Field of the Invention

The present invention relates to an ink jet recording apparatus and an ink jet recording method.

Description of the Related Art

In an ink jet recording method, an image is formed by directly or indirectly applying a liquid composition (ink) containing a coloring material onto a recording medium such as paper. At this time, problems such as beading and bleeding occur when a dot in a subsequent row is dropped adjacent to a landing dot before an ink droplet of the preceding landing dot is penetrated, dried, and fixed.

In particular, in multi-order color image formation, in a case where a succeeding ink droplet is dropped on a preceding ink in a state where an ink previously dropped on a paper surface is not permeated, dried, or fixed, a phenomenon in which the succeeding ink droplet is buried inside an image formed by the preceding ink occurs. Due to this phenomenon, a problem that color developability is impaired by the preceding ink and the succeeding ink being in a juxtaposition color mixture state (referred to as a post-bullet buried problem) may occur.

As a conventional technique for solving the above-described problem, a method of applying a reaction liquid to a recording medium in advance to improve ink cohesiveness and fixability, and a method of using a UV curable ink are already known. According to these techniques, for example, a primary color solid image formed with the preceding ink is coagulated and solidified with respect to the post-bullet buried problem, so that the succeeding ink can be suppressed from penetrating and being buried in the primary color solid image when the succeeding ink lands, and the deterioration in color developability can be suppressed.

Further, a method has been proposed in which a surface of a recording medium is treated by a plasma treatment unit to change wettability, a pH value, and permeability of the recording medium, thereby improving ink dot circularity and suppressing movement and beading of a pigment as a coloring material (Japanese Patent Application Laid-Open No. 2018-138384). Furthermore, as a method for obtaining a clear image by surface treatment of a recording medium, a method has been proposed in which the surface of the recording medium is treated by a corona treatment unit to improve wettability of the recording medium (Japanese Patent Application Laid-Open No. 2019-130869).

SUMMARY OF THE INVENTION

The present invention is directed to providing an ink jet recording apparatus and an ink jet recording method that can improve the post-bullet buried problem in a short time without requiring a large apparatus and that are even easier to control.

According to one aspect of the present invention, there is provided an ink jet recording apparatus including: a conveying unit that conveys a recording medium; a pretreatment unit that performs corona treatment on a surface of the recording medium; an ink image forming unit configured to be able to form an ink image by applying an ink of at least two colors the ink containing an anionic pigment; a brightness measuring unit that measures brightness of the ink image; and a corona treatment intensity changing unit configured to change a corona treatment intensity of the pretreatment unit based on a result of the brightness measuring unit.

Further, according to another aspect of the present invention, there is provided an ink jet recording method including: a conveying step of conveying a recording medium; a pretreatment step of performing corona treatment on a surface of the recording medium; an ink image forming step of forming an ink image by applying an ink of at least two colors; a brightness measuring step of measuring brightness of the ink image; and a corona treatment intensity changing step of changing a corona treatment intensity of the pretreatment step based on a result obtained in the brightness measuring step.

Further features of the present invention will become apparent from the following description of exemplary embodiments with reference to the attached drawings.

DESCRIPTION OF THE EMBODIMENTS

Figure 1A:
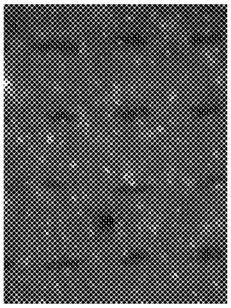
FIGS. 1A, 1B, 1C and 1D are diagrams illustrating images formed using inks of two colors on a recording medium subjected to corona treatment and a recording medium subjected to plasma treatment, respectively.

In the method of applying the reaction liquid to the recording medium in advance, it is necessary to evaporate and dry the moisture of the reaction liquid in addition to the moisture of the ink, and more drying time and a large drying device are required. Further, since the ultraviolet (UV) curable ink itself causes a chemical reaction and is fixed, there is a problem that weather resistance is good and it is strong against peeling, but high accuracy is required for controlling the reaction and handling becomes difficult.

In addition, in the method described in Japanese Patent Application Laid-Open No. 2018-138384, although the problems of beading and bleeding are improved, it is insufficient to solve the post-bullet buried problem.

Furthermore, in the case of using the method described in Japanese Patent Application Laid-Open No. 2019-130869, the wettability of the recording medium is improved, but there is room for improvement in the suppression of the post-bullet buried problem.

Therefore, the present inventors have intensively studied an ink jet recording apparatus and an ink jet recording method that can improve the post-bullet buried problem in a short time without requiring a large apparatus and is even easier to control, and have reached the present invention.

Hereinafter, an example of a configuration of an ink jet recording apparatus according to the present invention will be described. A corona discharge treatment may be simply called "corona treatment".

An ink jet recording apparatus according to the present invention includes: a conveying unit that conveys a recording medium; a pretreatment unit that performs corona treatment on a surface of the recording medium; an ink image forming unit configured to be able to form an ink image by applying an ink of at least two colors, the ink containing an anionic pigment; a brightness measuring unit that measures brightness of the ink image; and a corona treatment intensity changing unit that changes a corona treatment intensity of the pretreatment unit based on a result obtained by the brightness measuring unit.

Normally, the hydrophilicity of the recording medium is increased by the corona treatment, and a contact angle between water and the recording medium is reduced, so that the water spreads in a wet state.

On the other hand, as a result of intensive studies by the present inventors, it has been found that when the corona treatment intensity is high, it is possible to prevent the preceding ink and the succeeding ink from being in a juxtaposition color mixture state, and the post-bullet buried problem is improved. The corona treatment has an advantage that the treatment can be completed in a short time without requiring a large apparatus, and further the control is easy as compared with the method of applying a reaction liquid to a conventional recording medium in advance or the method of using a UV curable ink.

The reason why the post-bullet buried problem is improved when the corona treatment intensity is high is considered as follows.

By the high-intensity corona treatment, oxonium ions ($H_3O^+$) are generated on a surface of the recording medium. When an image is formed using an ink containing an anionic pigment containing an anionic group, $H_3O^+$ on the surface of the recording medium collapses a dispersion state of the anionic pigment, and aggregation and solidification of the ink are promoted. When an image is formed using inks of two or more colors, the preceding ink is aggregated and solidified before the succeeding ink lands. Therefore, the succeeding ink is not buried in the preceding ink, and thus color mixing does not occur. As a result, it is considered that the preceding ink and the succeeding ink can be prevented from being in the juxtaposition color mixture state, and the color developability can be improved.

Furthermore, when the corona treatment and the plasma treatment are compared, it has been found that the corona treatment can remarkably obtain an effect of preventing the preceding ink and the succeeding ink from being in the juxtaposition color mixture state as compared with the plasma treatment in the same or more treatment amount.

Figure 1B:
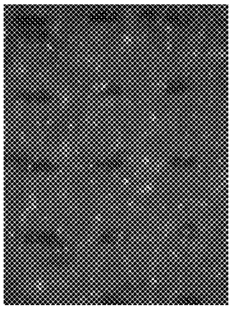
Figure 1C:
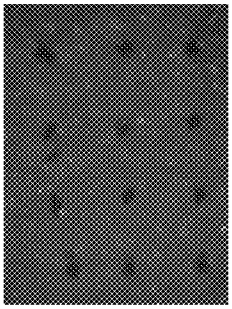
Figure 1D:
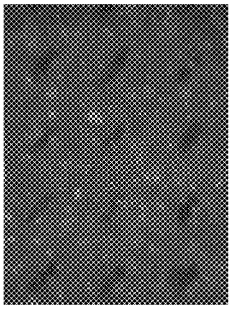

FIGS. 1A to 1D illustrate an example of an image formed on a recording medium subjected to corona treatment or plasma treatment. FIG. 1A is an image obtained using an untreated recording medium on which neither corona treatment nor plasma treatment is performed. Further, FIG. 1B is an image obtained using a recording medium subjected to corona treatment at an intensity of 2083 W·min/m$^2$, and FIG. 1C is an image obtained using a recording medium subjected to corona treatment at an intensity of 8333 W·min/m$^2$. Furthermore, FIG. 1D is an image obtained using a recording medium subjected to plasma treatment at an intensity of 110,000 W·min/m$^2$.

As a recording medium, PET50(A) PAT1 8LK (Hereinafter, referred to as a PET film) manufactured by LINTEC Corporation was used. The ink is an aqueous pigment ink containing an anionic group, and FIGS. 1A to 1D illustrate photographs obtained by forming a solid image of 8 g/m$^2$ using a cyan ink and then forming an image using a yellow ink.

When an unprocessed recording medium is used, it can be seen that the succeeding yellow ink droplets are buried in the cyan ink on which a solid image has been previously formed, and the yellow dots are elongated by advection due to drying of the cyan ink (FIG. 1A).

When the recording medium was subjected to the corona treatment, at the treatment intensity of 8333 W·min/m$^2$, the cyan ink was aggregated before the yellow ink landed, so that the yellow ink was less likely to be buried, and an advection flow in the cyan ink was suppressed. As a result, the circularity of the yellow dot increased (FIG. 1C). On the other hand, at the treatment intensity of 2083 W·min/m$^2$ (FIG. 1B), although the effect of the corona treatment is somewhat observed, it has been found that a degree of improvement of the post-bullet buried problem depends on the intensity of the corona treatment rather than the case of the treatment intensity of 8333 W·min/m$^2$ (FIG. 1C).

Further, in the case where the recording medium was subjected to the plasma treatment (FIG. 1D), the recording medium was subjected to the treatment at an intensity of 110,000 W·min/m$^2$ higher than that in the case of the corona treatment. Nevertheless, the yellow ink was buried, the dots were elongated by advection of the cyan ink, and the post-bullet buried problem was not improved.

It is known that the post-bullet buried problem significantly affects the color development of the image, particularly the brightness L*, and in a state in which the post-bullet illustrated in FIG. 1A is buried, the color mixture becomes juxtaposed and a value of the brightness L* increases.

On the other hand, in a state illustrated in FIG. 1C, the yellow ink is not buried on the cyan ink layer and overlaps in a layered form, whereby the juxtaposition color mixture is improved and the value of the brightness L* becomes low.

Figure 2:
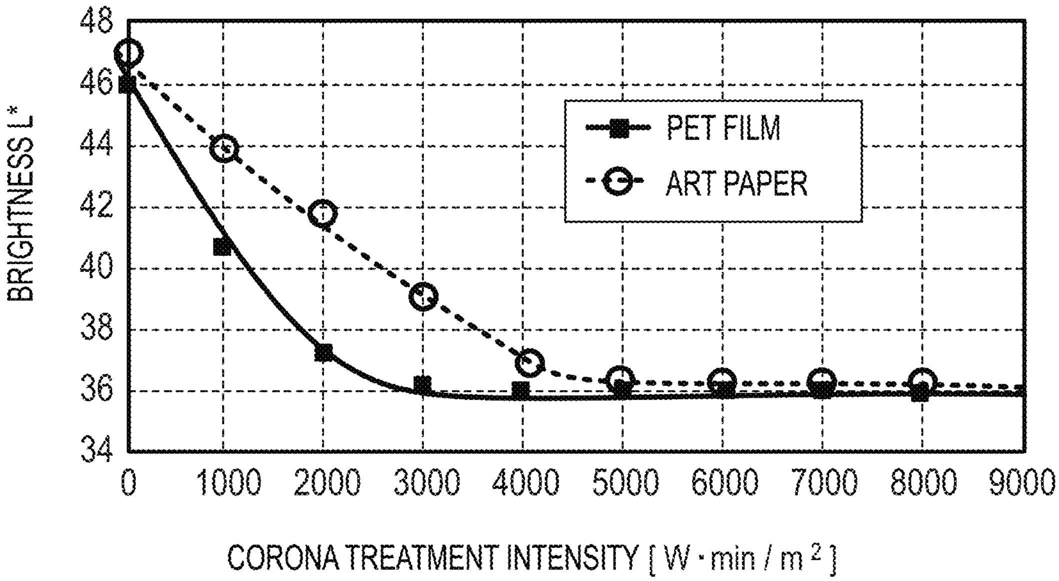
FIG. 2 is a diagram illustrating a correlation between brightness L* of an image formed on a PET film and an art paper and a corona treatment intensity.

FIG. 2 is a graph illustrating a relationship between a corona treatment intensity and a brightness L* value of an image formed on a PET film and Art E PW 8R(N) (Hereinafter, it is described as art paper) manufactured by LINTEC Corporation. Here, the formed image is a solid image formed with a total of 16 g/m$^2$ in which a preceding ink is a cyan ink, a succeeding ink is a yellow ink, and both the cyan ink and the yellow ink are 8 g/m$^2$.

From FIG. 2, it can be seen that the value of the brightness L* depends on the corona treatment intensity regardless of whether the PET film or the art paper is used. As the corona treatment intensity increases, the brightness L* becomes a smaller value, which is because the post-bullet buried problem is further improved by performing the corona treatment with a higher intensity as described with reference to FIGS. 1A to 1D.

Further, it can be seen that the brightness L* of the image formed on the PET film is substantially constant at a treatment intensity of about 3000 W·min/m$^2$ or more, while the brightness L* of the image formed on the art paper is substantially constant at a treatment intensity of about 5000 W·min/m$^2$ or more. That is, an amount of effect of lowering the brightness L* varies depending on the type of the recording medium to be used even with the same treatment intensity.

In other words, for example, a case is considered in which an image is formed after the recording medium is subjected to the corona treatment at a treatment intensity at which the brightness L* becomes substantially constant even if the treatment intensity is further increased. At this time, it is necessary to increase the treatment intensity by about 2000 W·min/m$^2$ in the case of using the art paper as compared with the case of using the PET film. Further, for example, when an image is formed after the PET film is subjected to the corona treatment at an intensity of about 5000 W·min/m$^2$, an image in which the brightness L* value is sufficiently lowered can be obtained. However, in the case of the PET film, an image having a brightness L* value almost equally small can be obtained even when the treatment intensity is about 3000 W·min/m$^2$, so that about 2000 W·min/m$^2$ of the treatment intensity of 5000 W·min/m$^2$ is excessive.

From the above, it can be seen that it is necessary to appropriately determine the corona treatment intensity according to the type of recording medium in order to sufficiently improve the post-bullet buried problem by the corona treatment.

An ink jet recording apparatus according to the present invention includes a brightness measuring unit and a corona treatment intensity changing unit. As a result, it is possible to clarify the corona treatment intensity necessary for forming an image in which the brightness L* value is sufficiently lowered with respect to various recording media. Furthermore, since an optimized corona treatment intensity can be determined for various recording media, it is possible to save an amount of power related to excessive treatment intensity by using the ink jet recording apparatus according to the present invention.

Note that, although a mechanism is unknown as to the reason why the effect of improving the post-bullet buried problem such as the corona treatment cannot be obtained regardless of the fact that the treatment intensity is higher in the plasma treatment, it is estimated that an amount of $H_3O^+$ generated in the plasma treatment is small.

In addition, since there is a concern that the surface of the recording medium is damaged by the corona treatment, the color and transparency of the recording medium after the corona treatment were observed, and surface roughness Sa was evaluated. A PET film and Art E PW 8E (manufactured by LINTEC Corporation) were used as a recording medium, and the intensity of the corona treatment was tested up to 25000 W·min/m$^2$. As a result of comparing the recording media before and after the corona treatment, it has been confirmed that there is no change in the color and transparency of the recording medium, and there is no change in the surface roughness Sa.

Hereinafter, the present invention will be described in detail with reference to preferred embodiments. Note that the embodiments described below are preferred embodiments of the present invention, and thus various technically preferable limitations are given, but the scope of the present invention is not unduly limited by the following description. In addition, not all the configurations described in the present embodiment are essential components of the present invention.

Hereinafter, an ink jet recording apparatus according to an embodiment of the present invention will be described with reference to the drawings.

Figure 3:
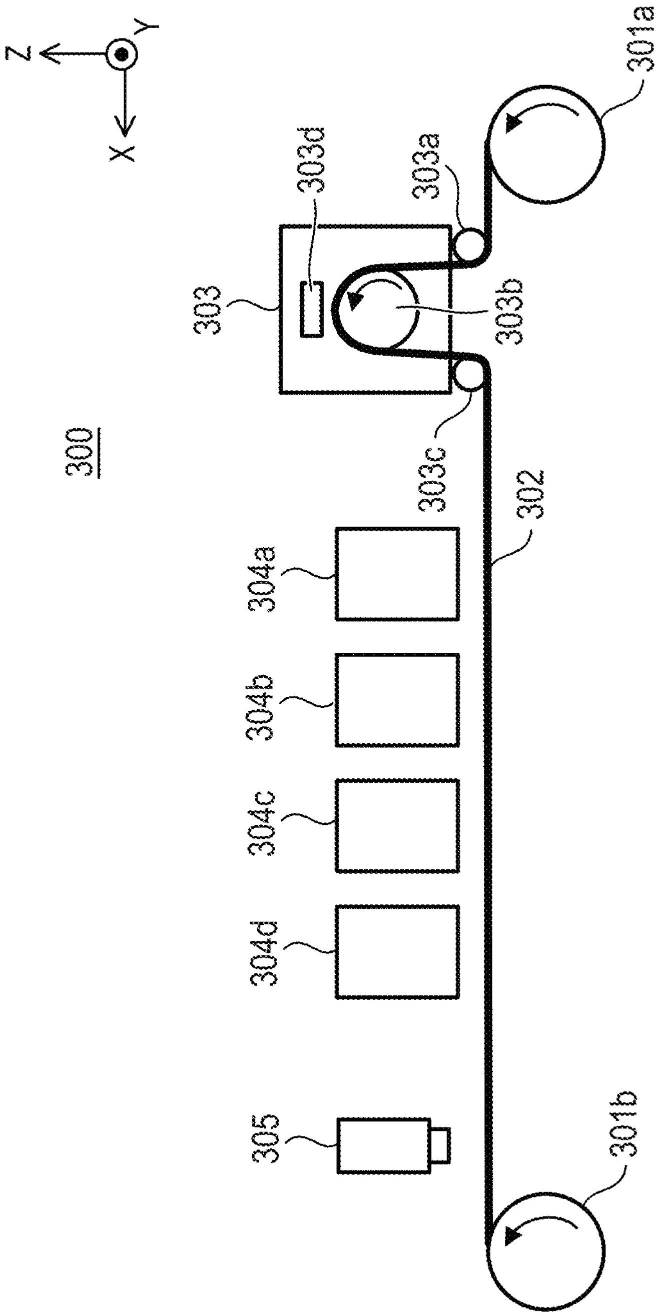
FIG. 3 is a schematic diagram illustrating an example of a configuration of an ink jet recording apparatus according to the present invention.

FIG. 3 is a schematic diagram illustrating an example of a schematic configuration of an ink jet recording apparatus 300 according to the present embodiment. In the present apparatus, a recording medium 302, which is a continuous sheet formed in a roll shape, is unwound from an unwinding unit 301*a* and wound by a winding unit 301*b*. The recording medium 302 unwound from the unwinding unit 301*a* passes through a corona treatment unit 303 as a pretreatment unit, and is subjected to corona treatment. Thereafter, the recording medium passes through ink jet recording heads 304*a* to 304*d* as ink image forming units, and an ink of each color is applied. The ink jet recording head 304*a* is a head that ejects a cyan ink, the ink jet recording head 304*b* is a head that ejects a magenta ink, the ink jet recording head 304*c* is a head that ejects a yellow ink, and the ink jet recording head 304*d* is a head that ejects a black ink. Furthermore, the color density of an image drawn by the ink jet recording head can be read by a colorimeter 305 as a brightness measuring unit.

In the ink jet recording apparatus 300 illustrated in FIG. 3, the corona treatment unit 303 as the pretreatment unit is disposed upstream of the ink jet recording heads 304*a* to 304*d* as the ink image forming units with respect to a conveyance direction of the recording medium. Further, the colorimeter 305 as the brightness measuring unit is disposed downstream of the ink jet recording heads 304*a* to 304*d* as the ink image forming units with respect to the conveyance direction of the recording medium.

<Recording Medium>

The recording medium used in the present invention may be a sheet paper or a winding paper, but a roll-shaped recording medium is preferable from the viewpoint of productivity.

As the recording medium, an absorbent recording medium that absorbs a liquid component, and a non-absorbent recording medium that does not absorb a liquid component are used.

Examples of the non-absorbent recording medium include a resin film. Examples thereof include a polyester film, a vinyl chloride film, a polypropylene film, a polyethylene film, a nylon film, and the like.

Examples of commercially available products of a synthetic resin film include Lumirror T60 (polyethylene terephthalate manufactured by Toray Industries, Inc.), Taiko FE2001 (corona-treated polyethylene terephthalate manufactured by FUTAMURA CHEMICAL CO., LTD.), PVC80B P (vinyl chloride manufactured by LINTEC Corporation), Kainas KEE70CA (polyethylene manufactured by LINTEC Corporation), YUPO SG90 PAT1 (polypropylene manufactured by LINTEC Corporation), Bonyl RX (nylon manufactured by KOHJIN Film & Chemicals Co., Ltd.), PET50(A) PAT1 8LK (PET manufactured by LINTEC Corporation), and the like.

Examples of the absorption recording medium include art paper, high-quality paper, and the like.

Examples of commercially available products of the absorption recording medium include 55PW8K (high quality paper manufactured by LINTEC Corporation), Art E PW 8K (coated paper manufactured by LINTEC Corporation), and the like.

<Recording Medium Conveyance Configuration>

A length of the recording medium in a Y direction is 330 mm, and a conveyance speed is controlled by rotation speeds of the unwinding unit 301*a* and the winding unit 301*b*. Note that the unwinding unit 301*a* and the winding unit 301*b* are connected to a drive motor and a control unit (not illustrated), and are configured to control the rotation speeds.

<Corona Treatment Unit>

A length of a corona electrode part 303*d* of the corona treatment unit 303 in the Y direction is 350 mm, and is connected to a generator (not illustrated) to supply electric power used for corona treatment. The recording medium 302 is suspended over idler rollers 303*a* and 303*c* of the corona treatment unit 303 and a grounded electrode-facing roller 303*b*. The corona treatment unit 303 generates corona discharge when the recording medium 302 passes between the corona electrode part 303*d* and the electrode-facing roller 303*b*, and performs corona treatment on a surface of the recording medium 302.

A treatment intensity (discharge quantity) Q [W·min/m$^2$] of the corona treatment can be controlled by a relationship of Formula (2) from a corona output value (electric power of the generator) E [W] of the generator, an electrode width D [m], and a conveyance speed V [m/min] of the recording medium 302.

$$Q=E/(D\times V) \quad \text{Formula (2)}$$

Figure 4:
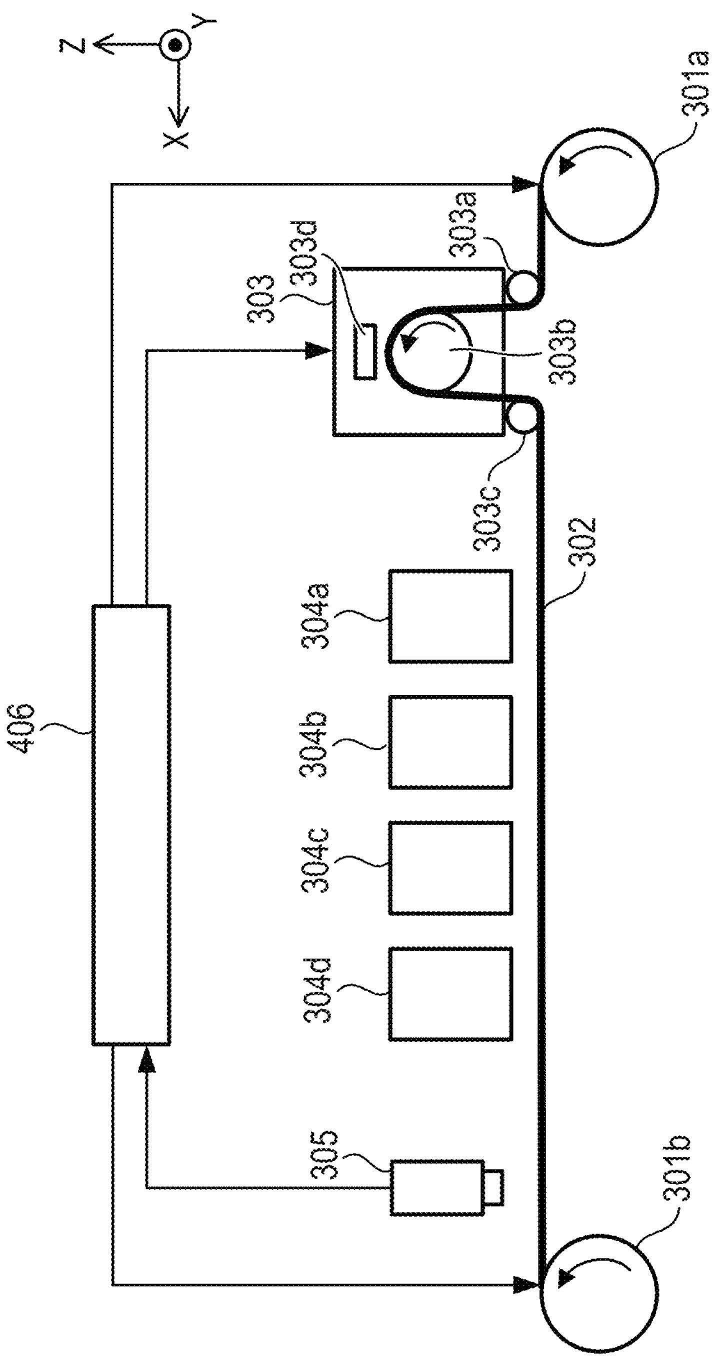
FIG. 4 is a schematic diagram illustrating a corona treatment intensity control system in the ink jet recording apparatus illustrated in FIG. 3.

Further, a role of a corona treatment intensity control unit 406 as a corona treatment intensity changing unit will be described with reference to FIG. 4.

The corona treatment intensity control unit 406 changes a condition of the corona treatment intensity according to the brightness L* of the image. After the brightness L* of the image drawn by the ink jet recording heads 304*a* to 304*d* is detected by the colorimeter 305, the detected data is fed back to the corona treatment intensity control unit 406. The corona treatment intensity control unit 406 sets a new corona treatment intensity based on the received detected data.

Next, the corona treatment intensity is fed back to drive control (not illustrated) that controls the rotation of the corona treatment unit 303 and/or the unwinding unit 301*a* and the winding unit 301*b*. Subsequently, in the corona treatment unit 303, a new corona output value is determined on the basis of a value of the corona treatment intensity. In the drive control (not illustrated) for controlling the rotation of the unwinding unit 301*a* and the winding unit 301*b*, a new conveyance speed of the recording medium is determined based on the corona treatment intensity.

Figure 5:
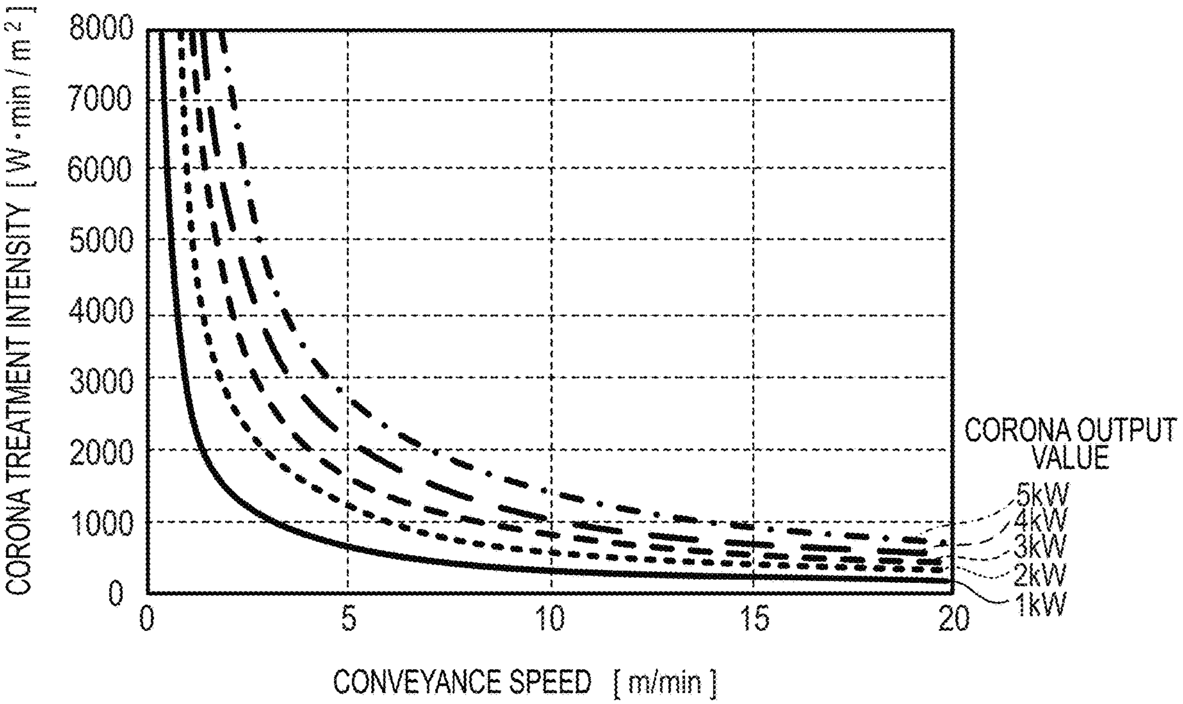
FIG. 5 is a schematic diagram illustrating a relationship between a corona treatment intensity and a conveyance speed with respect to a corona output value.

FIG. 5 is a graph illustrating an example of a relationship between a conveyance speed of the recording medium and a corona treatment intensity with respect to a corona output value.

In order to set the corona treatment intensity, it is necessary to change either or both of the corona output value and the conveyance speed described above. That is, the corona treatment intensity control unit 406 as the corona treatment intensity changing unit is configured to have at least one of the following two functions. One is a function of changing an output of the corona treatment of the corona treatment unit 303 as the pretreatment unit. The other is a function of changing a conveyance speed of the recording medium by drive control (not illustrated) that controls the rotation of the unwinding unit 301*a* and the winding unit 301*b* as a conveying unit.

The corona treatment intensity control unit 406 may previously hold a graph or a numerical list as illustrated in FIG. 5 illustrating a relationship between the corona output value and the conveyance speed, and determine the corona output value and the conveyance speed corresponding to the set value of the corona treatment intensity on the basis of the held data.

When the corona treatment intensity is set, the corona output value may be fixed and the conveyance speed may be determined based on the held data, or the conveyance speed may be fixed and the corona output value may be determined based on the held data. Further, for example, the corona output value may be preferentially changed, and in a case where a desired corona treatment intensity cannot be obtained even when the output of the corona treatment unit reaches the limit, the conveyance speed may be changed to set the target corona treatment intensity. That is, the intensity of the corona treatment on the recording medium can be increased by increasing the corona output value and decreasing the conveyance speed.

<Ink Applying Device>

In the present embodiment, the ink jet recording heads 304*a* to 304*d* are used as ink applying devices that apply inks.

Examples of the ink jet recording heads 304*a* to 304*d* include those having the following modes. A mode of ejecting an ink by causing film boiling in the ink by an electrothermal converter to form bubbles, a mode of ejecting an ink by an electromechanical converter, a mode of ejecting an ink using static electricity, and the like.

In the present embodiment, a known ink jet recording head can be used as the ink applying device. Among them, particularly from the viewpoint of high-speed and high-density printing, those using the electrothermal converter are suitably used. In drawing, the ink jet recording heads 304*a* to 304*d* receive an image signal, and apply a necessary amount of ink to each position.

In the present embodiment, each of the ink jet recording heads 304*a* to 304*d* is a full line head extending in the Y direction, and nozzles are arranged in a range covering a width of an image recording region of the recording medium having a maximum usable size. The ink jet recording heads 304*a* to 304*d* are arranged side by side in an X direction. Each of the ink jet recording head has an ink ejection surface in which nozzles are opened on a lower surface (recording medium side) thereof, and the ink ejection surface faces the surface of the recording medium with a minute gap (about several millimeters).

An ink application amount can be expressed by a density value, an ink thickness, or the like of image data. In the present embodiment, the mass of each ink dot was multiplied by the applied number, and an average value divided by an applied area was taken as the ink application amount (g/m$^2$).

An image in which the influence of the corona treatment remarkably appears is a solid image formed using inks of two or more colors. In the solid image described herein, at least in the image formed with the previously ejected ink, landing dots are in close contact with each other, and there is no place where the recording medium is exposed. Further, the succeeding ink is landed on the preceding ink in an arbitrary application amount to form a solid image. When the application amount of the succeeding ink is equal to that of the preceding ink, the influence of the corona treatment remarkably appears from the viewpoint of brightness.

<Ink>

Hereinafter, each component constituting the ink applied to the present embodiment will be described in detail.

(Coloring Material)

As the coloring material, a pigment is used. The ink contains at least an anionic pigment as the coloring material.

The content of the coloring material in the ink is preferably 0.5 to 15.0 mass %, and more preferably 1.0 to 10.0 mass % based on a total mass of the ink.

Specific examples of the pigment include inorganic pigments such as carbon black and titanium oxide, and organic pigments such as azo, phthalocyanine, quinacridone, isoindolinone, imidazolone, diketopyrrolopyrrole, and dioxazine.

As a method for dispersing the pigment, a resin-dispersed pigment using a resin as a dispersant, a self-dispersible pigment in which a hydrophilic group is bonded to a particle surface of the pigment, or the like can be used. Further, a resin-bonded pigment in which an organic group containing a resin is chemically bonded to a particle surface of a pigment, a microcapsule pigment in which a particle surface of a pigment is coated with a resin or the like, or the like can be used.

As a resin dispersant for dispersing the pigment in an aqueous medium, one capable of dispersing the pigment in the aqueous medium by the action of the anionic group is preferably used. As the resin dispersant, a resin as described later can be suitably used, and a water-soluble resin can be more suitably used. A content ratio (mass %) of the pigment is preferably 0.3 to 10.0 in terms of a mass ratio (pigment/resin dispersant) with respect to the content of the resin dispersant.

As the self-dispersible pigment, those in which an anionic group such as a carboxylic acid group, a sulfonic acid group or a phosphonic acid group is bonded to the particle surface of the pigment directly or via another atomic group (—R—) can be used. The anionic group may be either an acid type or a salt type, and when it is a salt type, it may be either a state in which a part thereof is dissociated or a state in which all thereof are dissociated. Examples of cations to be counter ions when the anionic group is a salt type include alkali metal cations, ammonium, organic ammonium, and the like. Further, specific examples of another atomic group (—R—) include a linear or branched alkylene group having 1 to 12 carbon atoms, an arylene group such as a phenylene group and a naphthylene group, a carbonyl group, an imino group, an amide group, a sulfonyl group, an ester group, and an ether group. In addition, these groups may be combined.

Further, if necessary, a dye may be used together with a pigment.

As the dye, a dye having an anionic group is preferably used. Specific examples of the dye include dyes such as azo, triphenylmethane, phthalocyanine, azaphthalocyanine, xanthene, and anthrapyridone.

(Resin)

The ink may contain a resin. The content (mass %) of the resin in the ink is preferably 0.1 to 20.0 mass %, and more preferably 0.5 to 15.0 mass %, based on a total mass of the ink.

The resin can be added to the ink for the following reasons: (i) a dispersion state of the pigment is stabilized, that is, the resin dispersant described above or acts as an aid thereof; and (ii) various characteristics of an image to be recorded are improved.

Examples of the mode of the resin include a block copolymer, a random copolymer, a graft copolymer, and a combination thereof.

In addition, the resin may be in a state of being dissolved in an aqueous medium as a water-soluble resin, or may be in a state of being dispersed in an aqueous medium as resin particles. The resin particles do not need to contain a coloring material.

In the present invention, the fact that the resin is water-soluble means that particles whose particle diameter can be measured by a dynamic light scattering method are not formed when the resin is neutralized with an alkali equivalent to the acid value of the resin. Whether or not the resin is water-soluble can be determined according to the following method.

First, a liquid (resin solid content: 10 mass %) containing a resin neutralized with an alkali (sodium hydroxide, potassium hydroxide, etc.) corresponding to an acid value is prepared. Next, the prepared liquid is diluted 10 times (volume basis) with pure water to prepare a sample solution. Then, when the particle size of the resin in the sample solution is measured by a dynamic light scattering method using a particle size distribution measuring device and particles having a particle size are not measured, it can be determined that the resin is water-soluble.

The measurement conditions at this time can be set to, for example, SetZero: 30 seconds, the number of measurements: 3 times, and the measurement time: 180 seconds. As the particle size distribution measuring device, a particle size analyzer by the dynamic light scattering method, for example, product name "UPA-EX150" manufactured by NIKKISO CO., LTD., or the like can be used. Of course, the particle size distribution measuring device, the measurement conditions, and the like to be used are not limited to the above.

The acid value of the resin is preferably 100 to 250 mgKOH/g in the case of the water-soluble resin, and is preferably 5 to 100 mgKOH/g in the case of the resin particles. The weight average molecular weight of the resin is preferably 3,000 to 15,000 in the case of a water-soluble resin, and is preferably 1,000 to 2 million in the case of resin particles. The volume average particle diameter of the resin particles measured by the dynamic light scattering method (measurement conditions are the same as above) is preferably 100 to 500 nm.

Examples of the resin include an acrylic resin, a urethane resin, and an olefin resin. Among them, the acrylic resin and the urethane resin are preferable.

The acrylic resin preferably has a hydrophilic unit and a hydrophobic unit as constituent units. Among them, a resin having a hydrophilic unit derived from (meth) acrylic acid and a hydrophobic unit derived from at least one of a monomer having an aromatic ring and a (meth)acrylic acid ester-based monomer is preferable. In particular, a resin having a hydrophilic unit derived from (meth)acrylic acid and a hydrophobic unit derived from at least one monomer of styrene and α-methylstyrene is preferable. Since these resins easily interact with the pigment, they can be suitably used as a resin dispersant for dispersing the pigment. Note that in the present specification, the notation of (meth) acrylic acid means a compound of acrylic acid or methacrylic acid. That is, for example, the (meth)acrylic acid ester means an acrylic acid ester or a methacrylic acid ester.

The hydrophilic unit is a unit having a hydrophilic group such as an anionic group. The hydrophilic unit can be formed, for example, by polymerizing a hydrophilic monomer having a hydrophilic group. Specific examples of the hydrophilic monomer having a hydrophilic group include acidic monomers having a carboxylic acid group such as (meth)acrylic acid, itaconic acid, maleic acid, and fumaric acid, anionic monomers such as anhydrides and salts of these acidic monomers, and the like. Examples of the cation constituting the salt of the acidic monomer include ions of lithium, sodium, potassium, ammonium, and organic ammonium.

The hydrophobic unit is a unit having no hydrophilic group such as an anionic group. The hydrophobic unit can be formed, for example, by polymerizing a hydrophobic monomer having no hydrophilic group such as an anionic group. Specific examples of the hydrophobic monomer include monomers having an aromatic ring such as styrene, α-methylstyrene, and benzyl (meth)acrylate, and (meth)acrylic acid ester monomers such as methyl (meth)acrylate, butyl (meth) acrylate, and 2-ethylhexyl (meth) acrylate.

The urethane-based resin can be obtained, for example, by reacting a polyisocyanate with a polyol. The urethane-based resin may be obtained by further reacting a chain extender.

Examples of the olefin-based resin include polyethylene and polypropylene.

(Aqueous Medium)

The ink may contain water or an aqueous medium that is a mixed solvent of water and a water-soluble organic solvent. As the water, deionized water or ion-exchanged water is preferably used. The content (mass %) of water in the aqueous ink is preferably 50.0 to 95.0 mass % based on a total mass of the ink. Further, the content ratio (mass %) of the water-soluble organic solvent in the aqueous ink is preferably 3.0 to 50.0 mass % based on a total mass of the ink. As the water-soluble organic solvent, any water-soluble organic solvent that can be used for ink jet inks such as alcohols, (poly) alkylene glycols, glycol ethers, nitrogen-containing compounds, and sulfur-containing compounds can be used.

(Other Additives)

In addition to the above components, the ink may contain various additives such as an antifoaming agent, a surfactant, a pH adjusting agent, a viscosity adjusting agent, a rust inhibitor, an antiseptic agent, an antifungal agent, an antioxidant, and a reduction inhibitor as necessary.

<Control System>

Figure 6:
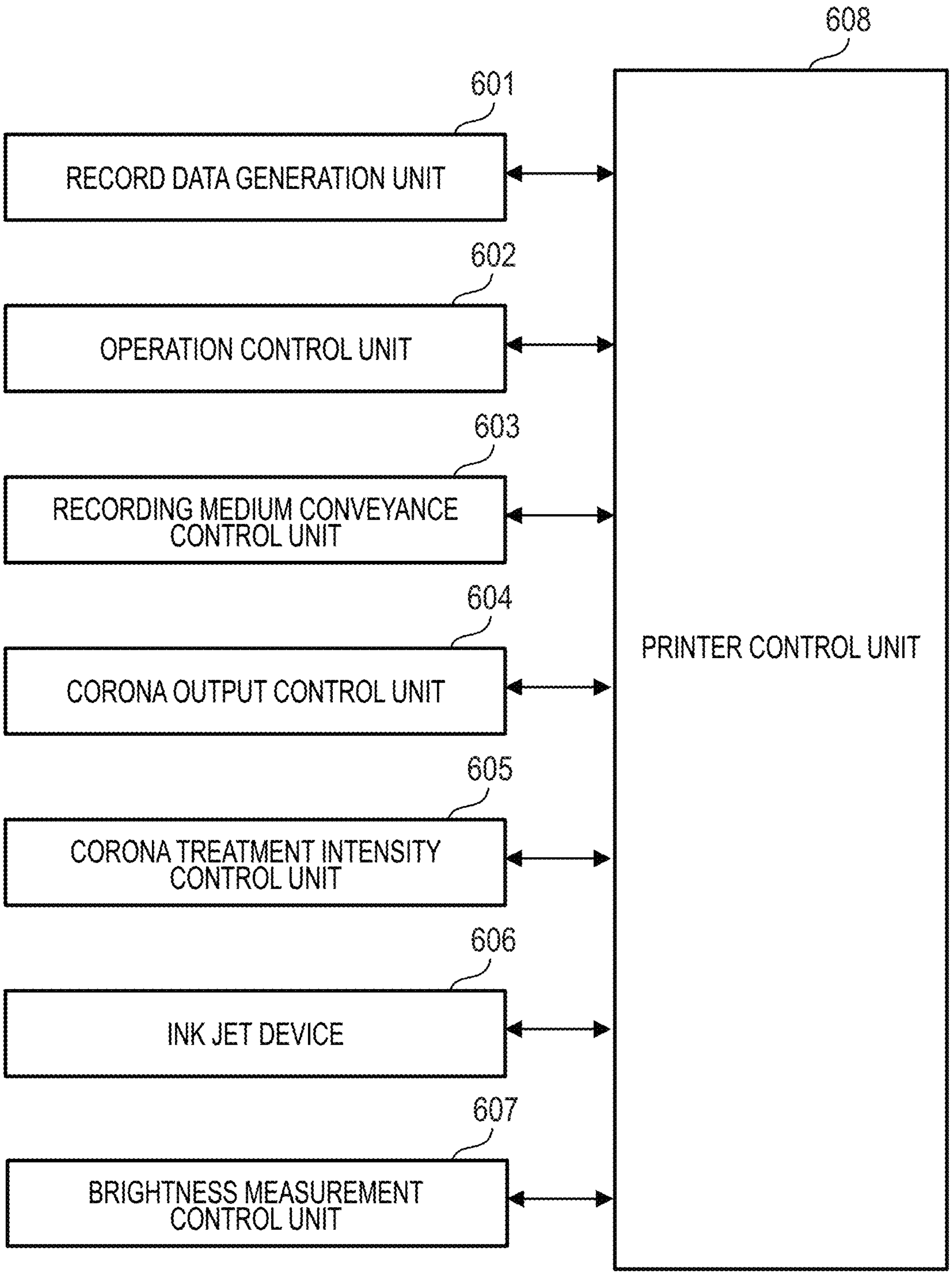
FIG. 6 is a block diagram illustrating a control system of the entire apparatus in the ink jet recording apparatus illustrated in FIG. 3.

The ink jet recording apparatus 300 according to the present embodiment includes a control system that controls each device. FIG. 6 is a block diagram illustrating a control system of the entire apparatus in the ink jet recording apparatus 300 illustrated in FIG. 3.

In FIG. 6, an external print server and the like can be cited as an example of a record data generation unit 601. Examples of an operation control unit 602 include an operation panel and the like. A recording medium conveyance control unit 603 performs control for conveying the recording medium. A corona output control unit 604 controls a corona output to the recording medium. A corona treatment intensity control unit 605 controls the corona treatment intensity according to the brightness L* measured by the colorimeter 305. An ink jet device 606 performs control for printing. A brightness measurement control unit 607 controls the measurement of the brightness L* of the image using the colorimeter 305. A printer control unit 608 performs control for performing a recording process. The corona treatment intensity control unit 605 feeds back the value to the corona output control unit 604 or the recording medium conveyance control unit 603 through the printer control unit 608.

Figure 7:
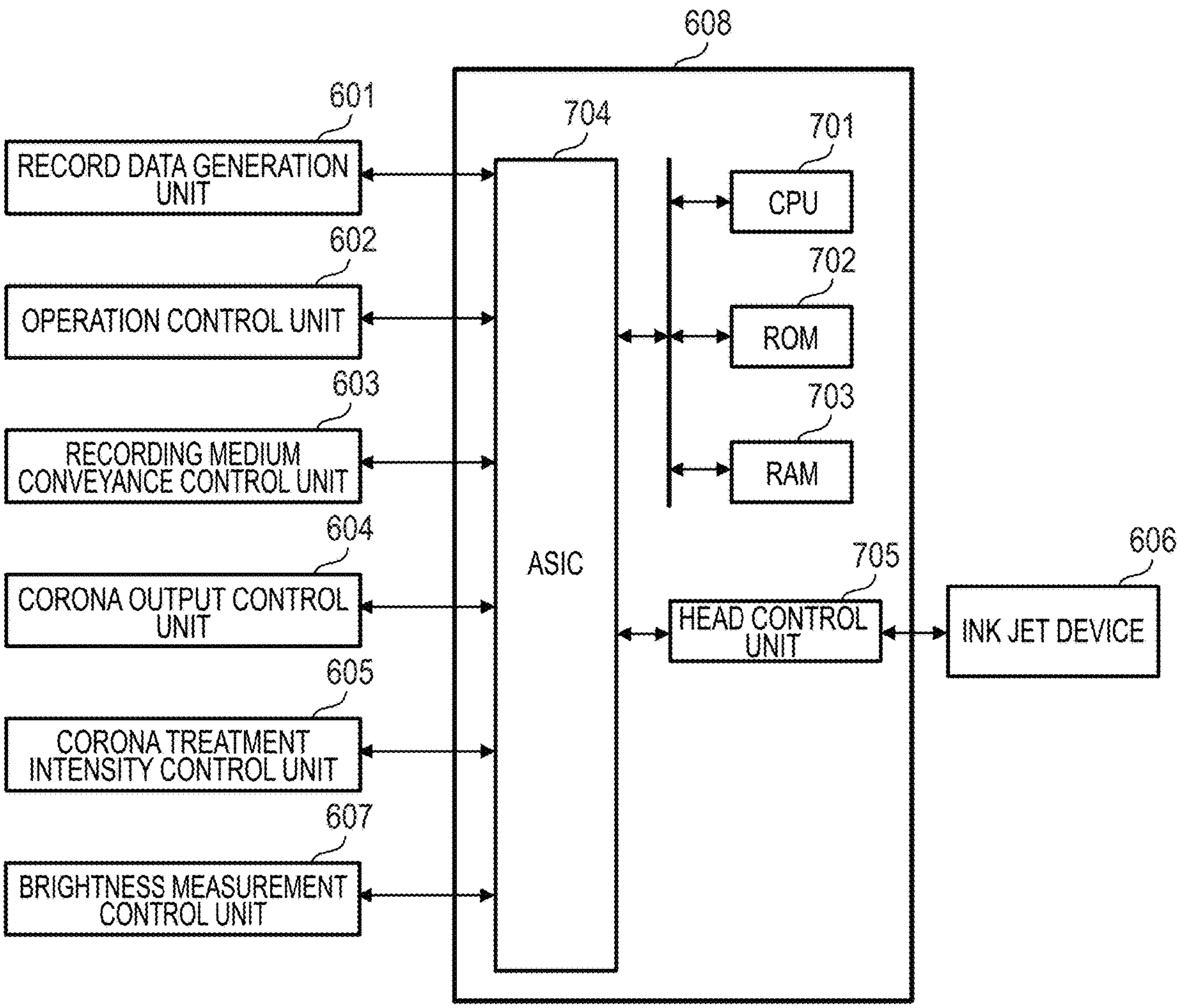
FIG. 7 is a block diagram of a printer control unit in the ink jet recording apparatus illustrated in FIG. 3.

FIG. 7 is a block diagram of the printer control unit 608 in the ink jet recording apparatus 300 of FIG. 3.

A CPU 701 controls the entire printer. A ROM 702 is used to store a control program of the CPU 701. A RAM 703 is used to execute a program. An application specific integrated circuit (Application Specific Integrated Circuit: ASIC) 704 incorporates a network controller, a serial IF controller, a controller for generating head data, a motor controller, and the like. A head control unit 705 generates final ejection data of the ink jet device 606, generates a drive voltage, and the like.

<Ink Jet Recording Method>

An ink jet recording method according to the present invention includes: a conveying step of conveying a recording medium; a pretreatment step of performing corona treatment on a surface of the recording medium; an ink image forming step of forming an ink image by applying an ink of at least two colors, the ink containing an anionic pigment; a brightness measuring step of measuring brightness of the ink image; and a corona treatment intensity changing step of changing a corona treatment intensity of the pretreatment step based on a result obtained in the brightness measuring step. The ink image is preferably a rectangular solid image.

<Flow of Setting Corona Treatment Intensity>

Figure 8:
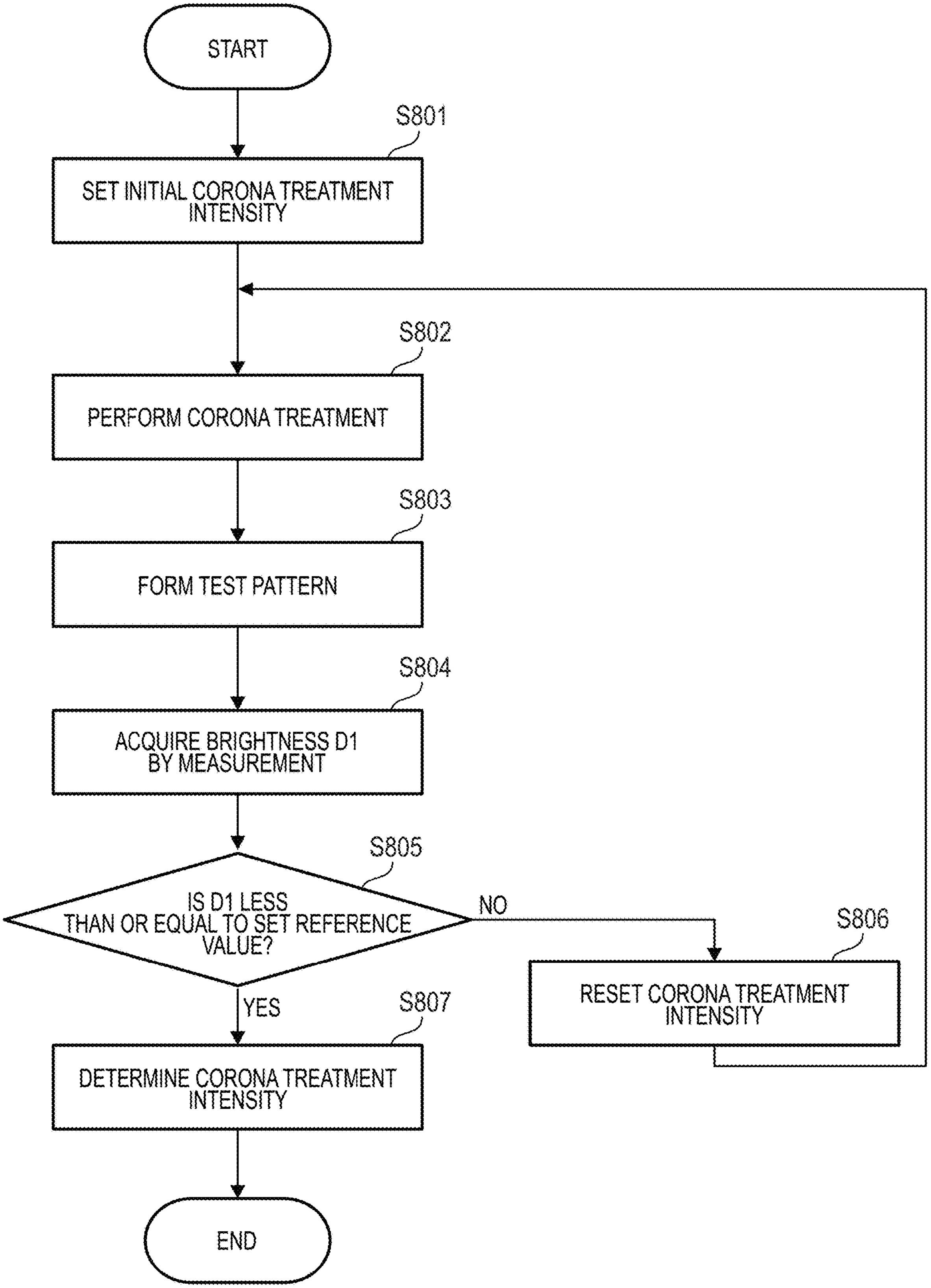
FIG. 8 is a diagram illustrating an example of a control flow for determining a corona treatment intensity at which brightness L* of an image to be formed is less than or equal to a reference value.
Figure 9:
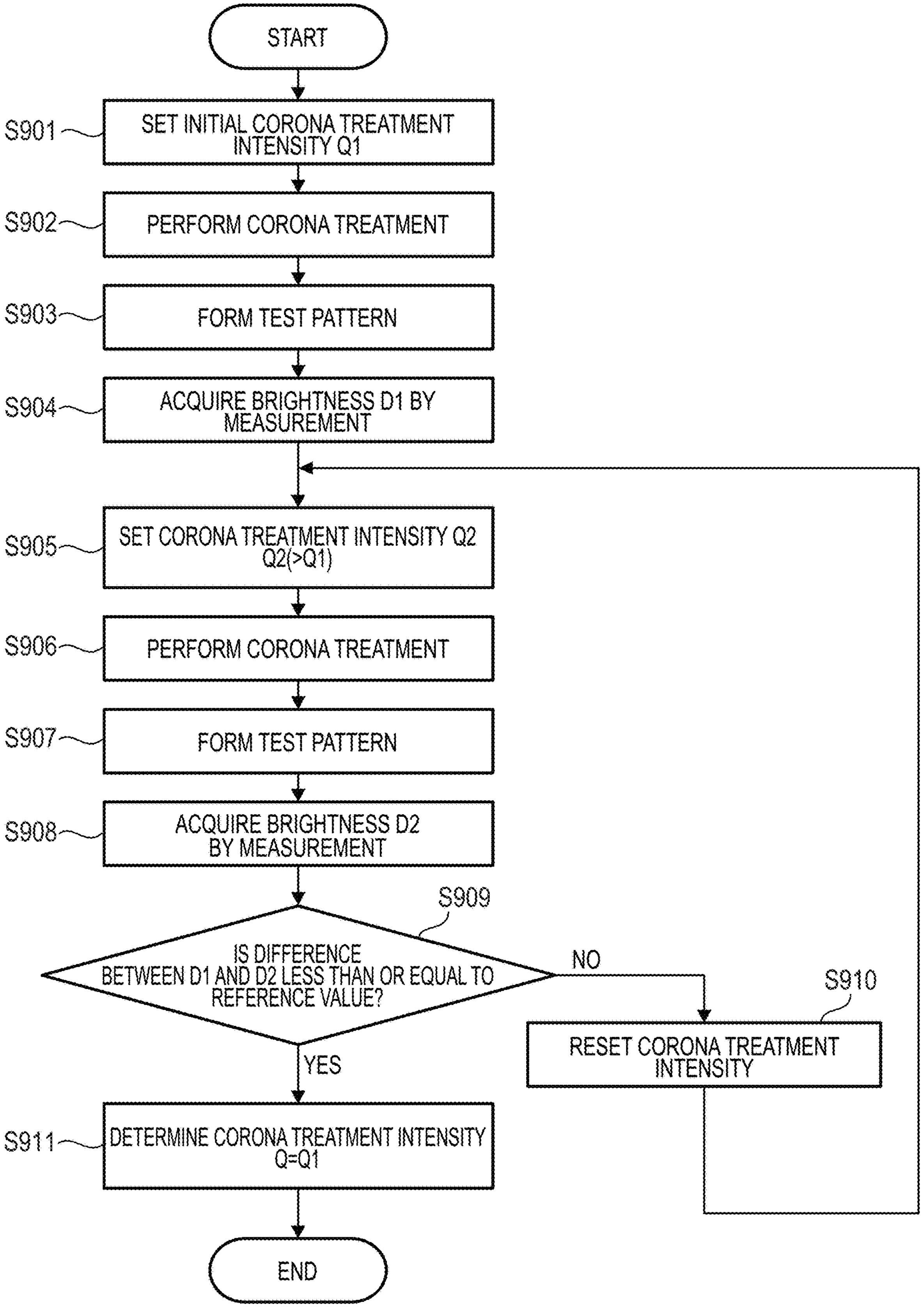
FIG. 9 is a diagram illustrating an example of a control flow for determining a corona treatment intensity at which a difference in brightness L* between images obtained under two different corona treatment intensity conditions is less than or equal to a reference value.

An example of a control flow for setting the corona treatment intensity is illustrated in FIGS. 8 and 9.

FIG. 8 illustrates a flow in which a reference value of brightness is provided, and the corona treatment intensity is set such that the brightness of the image to be formed is less than or equal to a preset brightness reference value.

In the flow illustrated in FIG. 8, first, an arbitrary corona treatment intensity (initial corona treatment intensity) is set in step S801. The initial corona treatment intensity is set to a value sufficiently low that the brightness of the image formed on the recording medium subjected to the corona treatment at the initial corona treatment intensity exceeds the reference value.

Next, in step S802, a corona treatment is performed on the recording medium with the corona treatment intensity set in step S801, and a test pattern is formed in step S803. The test pattern is an image using at least two colors of ink.

Next, in step S804, brightness measurement is performed using the colorimeter 305 to acquire brightness D1.

Thereafter, in step S805, it is determined whether the brightness D1 is less than or equal to a preset reference value. In a case where the brightness D1 is less than or equal to the reference value set in advance, the corona treatment intensity when the brightness becomes less than or equal to the reference value is determined in step S807, and the flow ends.

When the brightness D1 is not less than or equal to the reference value set in advance, the corona treatment intensity is reset to a higher value in step S806, and the corona treatment is executed again in step S802 to repeat the determination as to whether the brightness D1 is less than or equal to the reference value.

The smaller the increase in the corona treatment intensity at the time of resetting the corona treatment intensity in step S806, the more optimal the corona treatment intensity determined in step S807. This makes it possible to further improve the post-bullet buried problem while saving excessive power consumption.

Furthermore, as described above, the test pattern in step S803 is a solid image, and it is preferable that the preceding ink and the succeeding ink have the same application amount. As a result, the influence of the corona treatment intensity on the brightness becomes remarkable, and a more optimal corona treatment intensity can be set.

FIG. 9 illustrates a flow in which the corona treatment intensity is increased stepwise, and the corona treatment intensity is determined by changing the corona treatment intensity until the value of the difference between the brightness obtained at the n-th time and the brightness obtained at the (n+1)-th time becomes less than or equal to a preset brightness difference.

In the flow illustrated in FIG. 9, in step S901, first, a corona treatment intensity Q1 (initial corona treatment intensity) is set. Similarly to step S801, the corona treatment intensity Q1 is set to a value sufficiently low that the brightness of the image formed on the recording medium subjected to the corona treatment at the corona treatment intensity Q1 exceeds the reference value.

Next, corona treatment is executed in step S902, and a test pattern is formed on the recording medium subjected to the corona treatment in step S903. The test pattern is an image using at least two colors of ink.

Thereafter, in step S904, brightness measurement is performed using the colorimeter 305 to acquire brightness D1.

Next, a corona treatment intensity Q2 is set in step S905, and corona treatment is performed on the recording medium by the corona treatment intensity Q2 in step S906. Here, the corona treatment intensity Q2 is set to a value larger than Q1. Thereafter, in step S907, a test pattern is formed on a recording medium, and in step S908, the brightness D2 is acquired by measurement using the colorimeter 305. Since the corona treatment intensity Q2 is larger than Q1, the brightness D1 and the brightness D2 have a relationship of D2<D1.

Next, in step S909, a difference between the brightness D1 and the brightness D2 is calculated, and it is determined whether the value is equal to or less than a reference value. As illustrated in FIG. 2, when the corona treatment intensity is increased, the brightness of the image to be formed decreases. However, when the corona treatment intensity is increased, the brightness gradually decreases as compared with the increase in the corona treatment intensity, and the brightness does not substantially decrease. Therefore, as the reference value is a smaller value, the optimum corona treatment intensity for forming an image with better color development can be determined. When a difference between the brightness D1 and the brightness D2 is less than or equal to the reference value, the corona treatment intensity is determined to be Q1 in step S911.

On the other hand, when the difference between the brightness D1 and the brightness D2 is not equal to or less than the reference value, the corona treatment intensity is reset in step S910. Specifically, first, parameters of Q1 and brightness D1 in the control flow are updated to values of Q2 and brightness D2, respectively. In addition, the value of the corona treatment intensity Q2 is newly reset to a higher value.

Subsequently, with respect to the newly set corona treatment intensity Q2, a new brightness D2 is acquired through steps S906 to S908 again, and it is determined in step S909 whether or not the difference between the brightness D1 and the brightness D2 is less than or equal to the reference value. When the difference between the brightness D1 and the brightness D2 is not less than or equal to the reference value, the above flow is repeated until the difference between the brightness D1 and the brightness D2 becomes less than or equal to the reference value.

When the corona treatment intensity Q2 is reset in step S910, the increase in the corona treatment intensity may be equal to the difference between Q2 and Q1, or may be arbitrary. The smaller the increase in the corona treatment intensity in step S910, the more optimal the determined corona treatment intensity. This makes it possible to further improve the post-bullet buried problem while saving excessive power consumption.

As described above, the test pattern in steps S903 and S907 is a solid image, and it is preferable that the preceding ink and the succeeding ink have the same application amount. As a result, the influence of the corona treatment intensity on the brightness becomes remarkable, and a more optimal corona treatment intensity can be set.

When the corona treatment intensity is reset in step S806 in the flow illustrated in FIG. 8 and step S910 in the flow illustrated in FIG. 9, various methods can be used to determine the optimum corona treatment intensity. As illustrated in FIG. 2, since the degree of decrease in brightness decreases as the corona treatment intensity increases, for example, the increase in the corona treatment intensity at the time of resetting may be reduced every time the corona treatment intensity is reset.

In addition, the flow for determining the optimum corona treatment intensity is not limited to those illustrated in FIGS. 8 and 9. For example, even in a case where the corona treatment intensity is determined in the flows illustrated in FIGS. 8 and 9, when the increase in intensity when the corona treatment intensity is reset in step S806 or step S910 is too large, it is considered that there is room for further optimizing the corona treatment intensity. Therefore, in the flows illustrated in FIGS. 8 and 9, a flow for further optimizing the corona treatment intensity may be added when the brightness D1 or the difference between the brightness D1 and the brightness D2 is once obtained so as to fall below the reference value. Specifically, for example, although not limited thereto, the flow illustrated in FIG. 8 may be modified as follows.

In the flow illustrated in FIG. 8, a corona treatment intensity when the brightness D1 falls below the reference value is Qn. In addition, before Qn is obtained, the corona treatment intensity set immediately before is denoted by Qn−1, and the increase in the corona treatment intensity in step S806 when the corona treatment intensity Qn is set is denoted by A. At this time, at the corona treatment intensity Qn−1, the brightness D1 does not fall below the reference value, and the relationship of Qn−1+A=Qn is established.

Subsequently, in step S806, the corona treatment intensity is reset to Qm=Qn−1+A/2. That is, Qm is a value obtained by resetting the increase in the corona treatment intensity to a half of the last determined value. Then, according to the flow illustrated in FIG. 8, the brightness D1 when the corona treatment intensity is Qm is acquired, and the brightness D1 is compared with the reference value in step S805. When the brightness D1 falls below the reference value, the corona treatment intensity is determined as Qm, and when the brightness D1 does not fall below the reference value, the corona treatment intensity is determined as Qn.

By modifying the flow illustrated in FIG. 8 as described above, it is possible to further optimize the value of the corona treatment intensity and further improve the post-bullet buried problem while saving excessive power consumption.

According to the present invention, it is possible to provide an ink jet recording apparatus and an ink jet recording method that can improve the post-bullet buried problem in a short time without requiring a large apparatus and that are easy to control.

EXAMPLES

Hereinafter, the present invention will be described in more detail with reference to Examples and Comparative Examples, but the present invention is not at all limited to Examples below.

In Examples, the ink jet recording apparatus having the configuration illustrated in FIG. 3 was used.

Corona Master PS-1M (manufactured by Shinko Electric Instrument Co., Ltd., maximum corona discharge power: 5000 W, treatment width: 200 mm) was used as the corona treatment unit 303.

As the recording medium 302, two papers of PET50(A) PAT1 8LK manufactured by LINTEC Corporation and Art E PW 8R(N) manufactured by LINTEC Corporation were used. Note that, as described above, the PET50(A) PAT1 8LK is hereinafter abbreviated as a PET film, and the Art E PW 8R(N) is hereinafter abbreviated as art paper.

Furthermore, based on the ink ejection signal, two colors of cyan ink and magenta ink were ejected onto the recording medium using the ink jet recording head 304 (Nozzle density 1200 dpi, ejection amount 2.0 pL). The preceding ink was a cyan ink, and the succeeding ink was a magenta ink.

<Preparation of Anionic Pigment Ink>

The compositions of the cyan and magenta inks used in Examples are illustrated below.

(Ink Composition)

Each pigment dispersion liquid (pigment concentration: about 10%): 20.0%

As the pigment, Pigment Blue 15 was used in the cyan ink, and Pigment Red 7 was used in the magenta ink.

Styrene-ethyl acrylate-acrylic acid copolymer dispersion: 50.0%

(Dispersion concentration: about 20%, acid value: 150 mgKOH/g, weight average molecular weight: 8000)

Glycerin: 5.0%

Diethylene glycol: 7.0%

L31 (manufactured by ADEKA Corporation): 3.0%

Pure water: 15.0%

The materials were mixed in the formulation illustrated above and sufficiently stirred, and then subjected to pressure filtration with a cellulose acetate filter (manufactured by Advantec) having a pore size of 3.0 μm to adjust the ink.

An image (test pattern) to be used for measurement of the brightness L* was an image formed by applying 8 g/m$^2$ (16 g/m$^2$ in total) of each of a cyan ink and a magenta ink.

Table 1 illustrates a correspondence relationship among the corona treatment intensity, the corona output value, and the conveyance speed of the recording medium in the above configuration. Further, the correspondence relationship between the corona treatment intensity and the brightness L* with respect to the image formed on the PET film or the art paper subjected to the treatment intensity is illustrated in Table 1.

EXAMPLES AND COMPARATIVE EXAMPLES

Example 1

The corona treatment intensity was determined using the flow illustrated in FIG. 8.

When the corona treatment intensity is set in step S801 or step S806, the corona treatment intensity is set by fixing the corona output at 3000 W and changing the conveyance speed.

The initial corona treatment intensity in step S801 was set to 1000 W·min/m$^2$, and the increment in resetting the corona treatment intensity in step S806 was set to 1000 W·min/m$^2$.

In addition, a reference value of the brightness L* in step S805 was set to 37.0, and a PET film was used as a recording medium.

Example 2

The corona treatment intensity was determined using the flow illustrated in FIG. 8.

When the corona treatment intensity is set in step S801 or step S806, the conveyance speed is fixed at 2.0 m/min, and the corona treatment intensity is set by changing the corona output value.

The initial corona treatment intensity in step S801 was set to 1000 W·min/m$^2$, and the increment in resetting the corona treatment intensity in step S806 was set to 1000 W·min/m$^2$.

In addition, the reference value of the brightness L* in step S805 was set to 37.0, and a PET film was used as a recording medium.

Example 3

The corona treatment intensity was determined using the flow illustrated in FIG. 8.

The initial corona treatment intensity in step S801 was set to 1000 W·min/m$^2$, and the initial corona output value was set to 3000 W. In addition, the increment in resetting the corona treatment intensity in step S806 was set to 1000 W·min/m$^2$.

When the corona treatment intensity was reset in step S806, first, the corona treatment intensity was adjusted by increasing the corona output value. Here, the upper limit of the corona output value was set to 5000 W, and after the corona output value reached the upper limit when the corona treatment intensity was reset, the corona treatment intensity was adjusted by changing the conveyance speed.

TABLE 1

| Corona treatment intensity (W · min/m$^2$) | Required conveyance speed when corona output value is 3000 W (m/min) | Required conveyance speed when corona output value is 5000 W (m/min) | Required corona output value when conveyance speed is 2 m/min (W) | Brightness L* of image on PET film (—) | Brightness L* of image on art paper (—) |
|---|---|---|---|---|---|
| 100 | 8.6 | 14.3 | 700.0 | 41.0 | 44.0 |
| 2000 | 4.3 | 7.1 | 1400.0 | 37.5 | 42.0 |
| 3000 | 2.9 | 4.8 | 2100.0 | 36.0 | 39.5 |
| 4000 | 2.1 | 3.6 | 2800.0 | 36.0 | 38.0 |
| 5000 | 1.7 | 2.9 | 3500.0 | 36.0 | 36.5 |
| 6000 | 1.4 | 2.4 | 4200.0 | 36.0 | 36.5 |
| 7000 | 1.2 | 2.0 | 4900.0 | 36.0 | 36.5 |

In addition, the reference value of the brightness L* in step S805 was set to 37.0, and a PET film was used as a recording medium.

Example 4

The corona treatment intensity was determined using the flow shown in FIG. 9.

When the corona treatment intensity is set in step S901, step S905, or step S910, the corona treatment output is fixed at 3000 W, and the corona treatment intensity is set by changing the conveyance speed.

The corona treatment intensity Q1 in step S901 was set to 1000 W·min/$m^2$, the corona treatment intensity Q2 in step S905 was set to 2000 W·min/$m^2$, and the increment in resetting the corona treatment intensity in step S910 was set to 1000 W·min/$m^2$.

In addition, the reference value for the difference between the brightness D1 and the brightness D2 in step S909 was set to 1.0, and a PET film was used as a recording medium.

Example 5

The corona treatment intensity was determined using the flow shown in FIG. 9.

When the corona treatment intensity is set in step S901, step S905, or step S910, the conveyance speed is fixed at 2.0 m/min, and the corona treatment intensity is set by changing the corona output value.

The corona treatment intensity Q1 in step S901 was set to 1000 W·min/$m^2$, the corona treatment intensity Q2 in step S905 was set to 2000 W·min/$m^2$, and the increment in resetting the corona treatment intensity in step S910 was set to 1000 W·min/$m^2$.

In addition, the reference value for the difference between the brightness D1 and the brightness D2 in step S909 was set to 1.0, and a PET film was used as a recording medium.

Example 6

The corona treatment intensity was determined using the flow shown in FIG. 9.

The corona treatment intensity Q1 in step S901 was set to 1000 W·min/$m^2$, the corona treatment intensity Q2 in step S905 was set to 2000 W·min/$m^2$, and the initial corona output value in steps S901 and S905 was set to 3000 W. In addition, the increment in resetting the corona treatment intensity in step S910 was set to 1000 W·min/$m^2$.

Note that when the corona treatment intensity was reset in step S910, first, the corona treatment intensity was adjusted by increasing the corona output value. Here, the upper limit of the corona output value was set to 5000 W, and after the corona output value reached the upper limit when the corona treatment intensity was reset, the corona treatment intensity was adjusted by changing the conveyance speed.

In addition, the reference value for the difference between the brightness D1 and the brightness D2 in step S909 was set to 1.0, and a PET film was used as a recording medium.

Example 7

The corona treatment intensity was determined using the flow illustrated in FIG. 8.

When the corona treatment intensity is set in step S801 or step S806, the corona treatment intensity is set by fixing the corona output at 3000 W and changing the conveyance speed.

The initial corona treatment intensity in step S801 was set to 1000 W·min/$m^2$, and the increment in resetting the corona treatment intensity in step S806 was set to 1000 W·min/$m^2$.

In addition, the reference value of the brightness L* in step S805 was set to 37.0, and art paper was used as a recording medium.

Example 8

The corona treatment intensity was determined using the flow illustrated in FIG. 8.

When the corona treatment intensity is set in step S801 or step S806, the conveyance speed is fixed at 2.0 m/min, and the corona treatment intensity is set by changing the corona output value.

The initial corona treatment intensity in step S801 was set to 1000 W·min/$m^2$, and the increment in resetting the corona treatment intensity in step S806 was set to 1000 W·min/$m^2$.

In addition, the reference value of the brightness L* in step S805 was set to 37.0, and art paper was used as a recording medium.

Example 9

The corona treatment intensity was determined using the flow illustrated in FIG. 8.

The initial corona treatment intensity in step S801 was set to 1000 W·min/$m^2$, and the initial corona output value was set to 3000 W. In addition, the increment in resetting the corona treatment intensity in step S806 was set to 1000 W·min/$m^2$.

When the corona treatment intensity was reset in step S806, first, the corona treatment intensity was adjusted by increasing the corona output value. Here, the upper limit of the corona output value was set to 5000 W, and after the corona output value reached the upper limit when the corona treatment intensity was reset, the corona treatment intensity was adjusted by changing the conveyance speed.

In addition, the reference value of the brightness L* in step S805 was set to 37.0, and art paper was used as a recording medium.

Example 10

The corona treatment intensity was determined using the flow shown in FIG. 9.

When the corona treatment intensity is set in step S901, step S905, or step S910, the corona treatment output is fixed at 3000 W, and the corona treatment intensity is set by changing the conveyance speed.

The corona treatment intensity Q1 in step S901 was set to 1000 W·min/$m^2$, the corona treatment intensity Q2 in step S905 was set to 2000 W·min/$m^2$, and the increment in resetting the corona treatment intensity in step S910 was set to 1000 W·min/$m^2$.

In addition, the reference value for the difference between the brightness D1 and the brightness D2 in step S909 was set to 1.0, and art paper was used as a recording medium.

Example 11

The corona treatment intensity was determined using the flow shown in FIG. 9.

When the corona treatment intensity is set in step S901, step S905, or step S910, the conveyance speed is fixed at 2.0 m/min, and the corona treatment intensity is set by changing the corona output value.

The corona treatment intensity Q1 in step S901 was set to 1000 W·min/m$^2$, the corona treatment intensity Q2 in step S905 was set to 2000 W·min/m$^2$, and the increment in resetting the corona treatment intensity in step S910 was set to 1000 W·min/m$^2$.

In addition, the reference value for the difference between the brightness D1 and the brightness D2 in step S909 was set to 1.0, and art paper was used as a recording medium.

Example 12

The corona treatment intensity was determined using the flow shown in FIG. 9.

The corona treatment intensity Q1 in step S901 was set to 1000 W·min/m$^2$, the corona treatment intensity Q2 in step S905 was set to 2000 W·min/m$^2$, and the initial corona output value in steps S901 and S905 was set to 3000 W. In addition, the increment in resetting the corona treatment intensity in step S910 was set to 1000 W·min/m$^2$.

Note that when the corona treatment intensity was reset in step S910, first, the corona treatment intensity was adjusted by increasing the corona output value. Here, the upper limit of the corona output value was set to 5000 W, and after the corona output value reached the upper limit when the corona treatment intensity was reset, the corona treatment intensity was adjusted by changing the conveyance speed.

In addition, the reference value for the difference between the brightness D1 and the brightness D2 in step S909 was set to 1.0, and art paper was used as a recording medium.

Comparative Example 1

The recording medium was subjected to plasma treatment to form an image.

For the plasma treatment, a plasma treatment machine AP-T02-L150 (manufactured by Sekisui Chemical Co., Ltd., plasma generation power: 355.5 W, treatment width: 30 mm) was installed instead of the corona treatment unit in FIG. 3. In the plasma treatment, a mixed gas of oxygen and nitrogen (oxygen 3%) was caused to flow through a plasma generating portion (not illustrated), and the treatment was performed at an intensity of 11000 W·min/m$^2$.

A PET film was used as the recording medium, and the conveyance speed was set to 2.0 m/min.

Comparative Example 2

In Comparative Example 1, the recording medium used was changed to art paper. Other than that, image formation was performed in the same manner as in Comparative Example 1.

Comparative Example 3

An image was formed at a corona treatment intensity of 5000 W·min/m$^2$ (corona output value 3500 W, conveyance speed 2.0 m/min). A PET film was used as the recording medium.

Comparative Example 4

An image was formed at a corona treatment intensity of 7000 W·min/m$^2$ (corona output value 4900 W, conveyance speed 2.0 m/min). As the recording medium, art paper was used.

<Determined Corona Treatment Intensity and Brightness L* of Obtained Image>

The corona treatment intensity determined in Examples and Comparative Examples and the corona output value and the conveyance speed for realizing the determined corona treatment intensity are illustrated in Table 2. In addition, the brightness L* of the image obtained using the recording medium subjected to the corona treatment with the determined corona treatment intensity or the recording medium subjected to the plasma treatment is illustrated in Table 2.

TABLE 2

| | Determined corona treatment intensity (W · min/m$^2$) | Corona output value (W) | Conveyance speed (m/min) | Brightness L* of image (—) |
|---|---|---|---|---|
| Example 1 | 3000 | 3000 | 2.9 | 36.0 |
| Example 2 | 3000 | 2100 | 2.0 | 36.0 |
| Example 3 | 3000 | 5000 | 4.8 | 36.0 |
| Example 4 | 3000 | 3000 | 2.9 | 36.0 |
| Example 5 | 3000 | 2100 | 2.0 | 36.0 |
| Example 6 | 3000 | 5000 | 4.8 | 36.0 |
| Example 7 | 5000 | 3000 | 1.7 | 36.5 |
| Example 8 | 5000 | 3500 | 2.0 | 36.5 |
| Example 9 | 5000 | 5000 | 2.9 | 36.5 |
| Example 10 | 5000 | 3000 | 1.7 | 36.5 |
| Example 11 | 5000 | 3500 | 2.0 | 36.5 |
| Example 12 | 5000 | 5000 | 2.9 | 36.5 |
| Comparative Example 1 | | | 2.0 | 46.0 |
| Comparative Example 2 | | | 2.0 | 47.0 |
| Comparative Example 3 | 5000 | 3500 | 2.0 | 36.0 |
| Comparative Example 4 | 7000 | 4900 | 2.0 | 36.5 |

As can be seen from Table 2, in Examples 1 to 6 in which the PET film was subjected to the corona treatment, the brightness L* of the obtained image was lower than that in Comparative Example 1 in which the same PET film was subjected to the plasma treatment. This is because, as described above, by performing the corona treatment, the post-bullet buried problem as illustrated in FIGS. 1A to 1D is solved, and the juxtaposition color mixture state is prevented.

That is, it can be seen that the post-bullet buried problem could be solved by determining the corona treatment intensity by the flow illustrated in FIG. 8 or 9 and performing the corona treatment with the determined intensity even when either a PET film or art paper was used as the recording medium.

The method of applying the corona treatment to the recording medium does not require a large apparatus as compared with the method of applying the reaction liquid to the recording medium in advance, and the treatment is completed in a short time. Furthermore, as described above, it can be seen that an image with lower brightness L* can be formed by applying the corona treatment as compared with the case where the plasma treatment is applied to the recording medium, and the post-bullet buried problem is improved.

Furthermore, by determining the required corona treatment intensity according to the flow illustrated in FIG. 8 or 9, it is possible to reliably improve the post-bullet buried problem.

In addition, the same brightness L* value could be obtained in Examples 1 to 6 as compared with Comparative Example 3 in which the corona treatment intensity was not optimized by the flow illustrated in FIG. 8 or 9 and was set to an arbitrarily determined value (5000 W·min/$m^2$). Furthermore, in Examples 1 to 6, the corona treatment intensity was lower than that in Comparative Example 3, and it can be seen that excessive power could be saved.

In Examples 1 and 4, the corona output value is low, and the conveyance speed is high. In Examples 2 and 5, the corona output value is low. In Examples 3 and 6, the conveyance speed can be set to be remarkably high.

The same applies to the case of using art paper as the recording medium as in the case of using the PET film.

Further, the same brightness L* value could be obtained in Examples 7 to 12 as compared with Comparative Example 4 in which the corona treatment intensity was not optimized by the flow illustrated in FIG. 8 or 9 and was set to an arbitrarily determined value (7000 W·min/$m^2$). Furthermore, it can be seen that in Examples 7 to 12, the corona treatment intensity was lower than that in Comparative Example 4, and excessive power could be saved.

Therefore, by determining the optimum corona treatment intensity by the flow illustrated in FIG. 8 or 9, excessive power consumption can be saved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-099785, filed Jun. 15, 2021, and Japanese Patent Application No. 2022-093791, filed Jun. 9, 2022, which are hereby incorporated by reference herein in their entirety.

What is claimed is:

1. An ink jet recording apparatus comprising:
- a conveying unit that conveys a recording medium;
- a pretreatment unit that performs corona treatment on a surface of the recording medium;
- an ink image forming unit configured to be able to form an ink image by applying inks of at least two colors so that one of the inks overlaps a region on the recording medium to which another of the inks has been applied, each of the inks containing an anionic pigment;
- a brightness measuring unit that measures brightness of the ink image containing a region which is overlapped by the inks of at least two colors; and
- a corona treatment intensity changing unit configured to change a corona treatment intensity of the pretreatment unit based on a result obtained by the brightness measuring unit.

2. The ink jet recording apparatus according to claim 1, wherein the corona treatment intensity changing unit is configured to change the corona treatment intensity of the pretreatment unit until the result obtained by the brightness measuring unit becomes less than or equal to a preset brightness reference value.

3. The ink jet recording apparatus according to claim 1, wherein the corona treatment intensity changing unit is configured to increase the corona treatment intensity stepwise, and change the corona treatment intensity of the pretreatment unit until a value of a difference between brightness obtained at an n-th time in the brightness measuring unit and brightness obtained at an (n+1)-th time becomes less than or equal to a preset brightness difference.

4. The ink jet recording apparatus according to claim 1, wherein the corona treatment intensity changing unit is configured to change an output of the corona treatment of the pretreatment unit.

5. The ink jet recording apparatus according to claim 1, wherein the corona treatment intensity changing unit is configured to change a conveying speed of the recording medium in the conveying unit.

6. The ink jet recording apparatus according to claim 1, wherein the pretreatment unit is disposed upstream of the ink image forming unit with respect to a conveyance direction of the recording medium.

7. The ink jet recording apparatus according to claim 1, wherein the brightness measuring unit is disposed downstream of the ink image forming unit with respect to a conveying direction of the recording medium.

8. An ink jet recording method comprising:
- a conveying step of conveying a recording medium;
- a pretreatment step of performing corona treatment on a surface of the recording medium;
- an ink image forming step of forming an ink image by applying inks of at least two colors so that one of the inks overlaps a region on the recording medium to which another of the inks has been applied, each of the inks containing an anionic pigment;
- a brightness measuring step of measuring brightness of the ink image containing a region which is overlapped by the inks of at least two colors; and
- a corona treatment intensity changing step of changing a corona treatment intensity in the pretreatment step based on a result obtained in the brightness measuring step.

9. The ink jet recording method according to claim 8, wherein the ink image is a rectangular solid image.

* * * * *